United States Patent

Sandor, Jr.

[11] Patent Number: 5,220,881
[45] Date of Patent: Jun. 22, 1993

[54] FISH TANK VENTILATION APPARATUS

[76] Inventor: Kenneth J. Sandor, Jr., 94 Louis St., Carteret, N.J. 07008

[21] Appl. No.: 881,178

[22] Filed: May 11, 1992

[51] Int. Cl.$^5$ ............................ A01K 63/00; A01K 63/06
[52] U.S. Cl. ................................ 119/5; 119/51.04
[58] Field of Search .............. 119/3, 5, 15, 17, 51.04; 210/169

[56] References Cited

U.S. PATENT DOCUMENTS

| | | | |
|---|---|---|---|
| 3,091,220 | 5/1963 | Willinger et al. | 119/5 |
| 3,721,212 | 3/1973 | Groth | 119/5 |
| 3,857,366 | 12/1974 | Willinger | 119/5 |
| 4,151,810 | 5/1979 | Wiggins | 119/5 |
| 4,206,719 | 6/1980 | Faris | 119/5 |
| 4,552,093 | 11/1985 | Puckett | 119/17 |
| 5,072,695 | 12/1991 | Newton et al. | 119/5 |

FOREIGN PATENT DOCUMENTS 2731363  1/1979  Fed. Rep. of Germany .......... 119/5

Primary Examiner—John G. Weiss

[57] ABSTRACT

An apparatus to direct an air barrier between a fish tank cover mounted above a fish tank is arranged to include a housing directing pressurized air into the cover for ventilation through the cover providing an air barrier. A modification of the invention includes manifold structure to enhance dispersion of pressurized air between the manifold cover hood and an underlying fish tank.

5 Claims, 4 Drawing Sheets

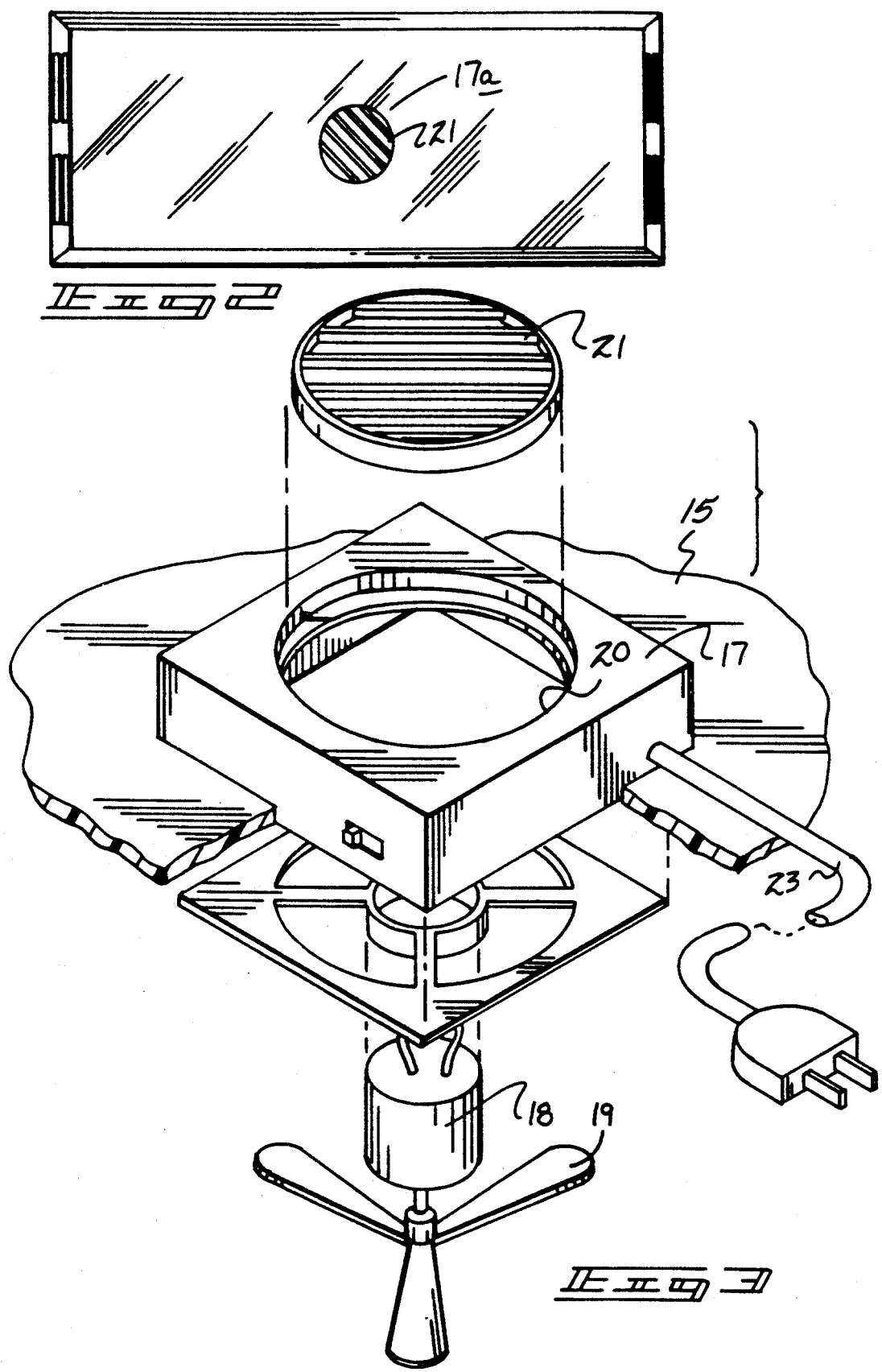

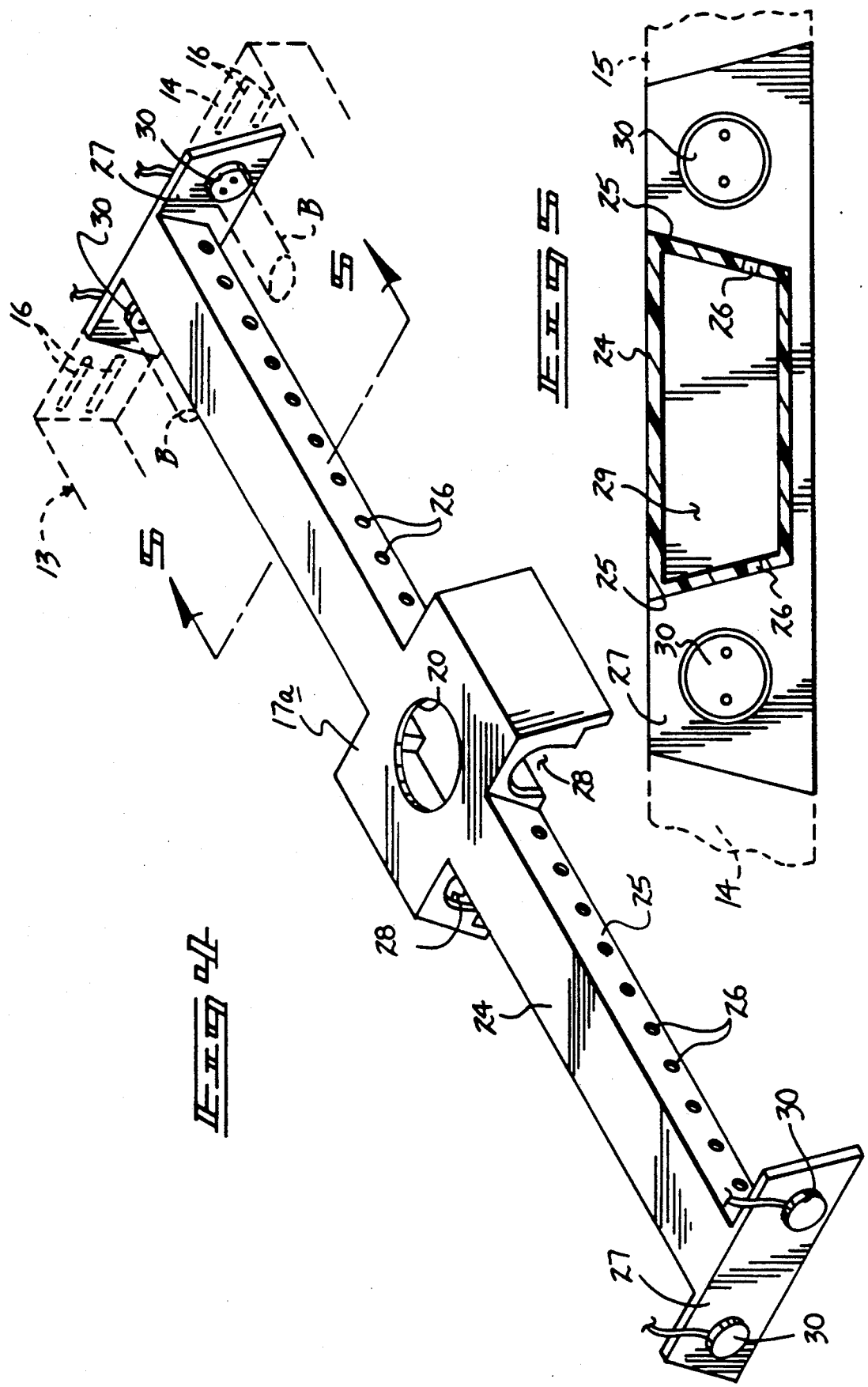

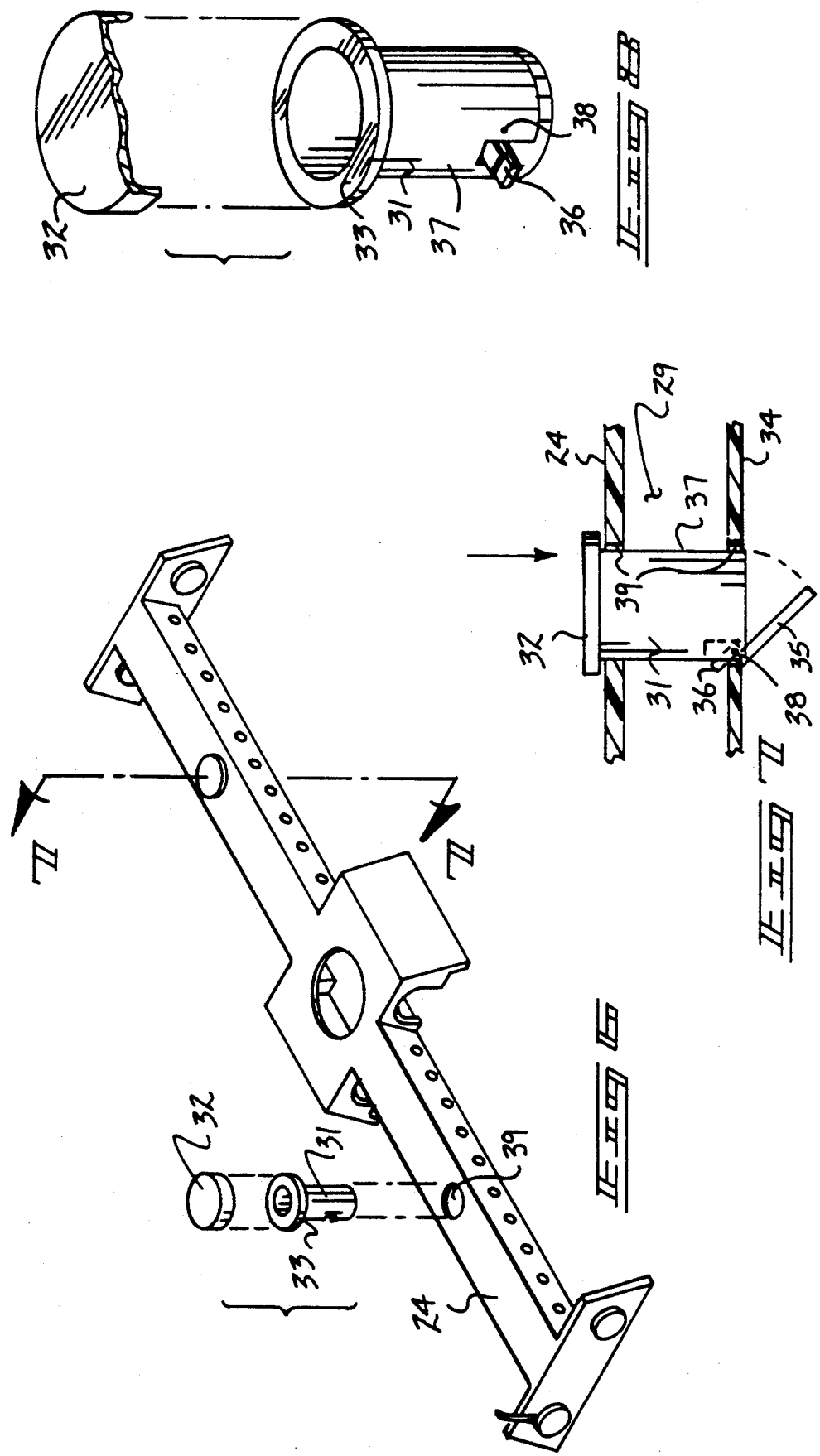

FISH TANK VENTILATION APPARATUS

BACKGROUND OF THE INVENTION

1. Field of the Invention

The field of invention relates to fish tank apparatus, and more particularly pertains to a new and improved fish tank ventilation apparatus wherein the same provides an air barrier between the tank cover and tank to permit directing of pressurized air into the cover for ventilation.

2. Description of the Prior Art

Various aquarium covers are available in the prior art to accommodate illumination and the like therewithin. Such a cover structure is set forth in U.S. Pat. No. 3,857,366 to Willinger.

U.S. Pat. No. 4,078,522 to Akers sets forth a cover having a housing directed thereabove to conceal an aquarium pump therewithin.

U.S. Pat. No. 3,913,526 to Hall sets forth an aquarium cover for reflective illumination of an underlying aquarium tank.

U.S. Pat. Nos. 3,805,740 and 4,920,922 are further examples of covering aquarium lids for use in illumination of an aquarium structure.

As such, it may be appreciated that there continues to be a need for a new and improved fish tank ventilation apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fish tank apparatus now present in the prior art, the present invention provides a fish tank ventilation apparatus wherein the same pressurizes an air barrier between a cover hood and an underlying fish tank. As such, the general purpose of the present invention, which will be described subsequently in greater detail, is to provide a new and improved fish tank ventilation apparatus which has all the advantages of the prior art fish tank apparatus and none of the disadvantages.

To attain this, the present invention provides an apparatus to direct an air barrier between a fish tank cover mounted above a fish tank, to include a housing directing pressurized air into the cover for ventilation through the cover providing an air barrier. A modification of the invention includes manifold structure to enhance disperson of pressurized air between the manifold cover hood and an underlying fish tank.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish tank ventilation apparatus which has all the advantages of the prior art fish tank apparatus and none of the disadvantages.

It is another object of the present invention to provide a new and improved fish tank ventilation apparatus which may be easily and efficiently manufactured and marketed.

It is a further object of the present invention to provide a new and improved fish tank ventilation apparatus which is of a durable and reliable construction.

An even further object of the present invention is to provide a new and improved fish tank ventilation apparatus which is susceptible of a low cost of manufacture with regard to both materials and labor, and which accordingly is then susceptible of low prices of sale to the consuming public, thereby making such fish tank ventilation apparatus economically available to the buying public.

Still yet another object of the present invention is to provide a new and improved fish tank ventilation apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic top view of the instant invention.

FIG. 3 is an isometric illustration of the ventilation housing mounted within the cover hood.

FIG. 4 is an isometric illustration of a modified manifold structure mounted within the cover hood.

FIG. 5 is an orthographic view, taken along the lines 5—5 of FIG. 4 in the direction indicated by the arrows.

FIG. 6 is an isometric illustration of the manifold structure having fish feeders therewithin.

FIG. 7 is an orthographic view, taken along the lines 7—7 of FIG. 6 in the direction indicated by the arrows.

FIG. 8 is an isometric illustration of a fish feeder cylinder utilized by the invention.

DESCRIPTION OF THE PREFERRED EMBODIMENT

Figure 1:
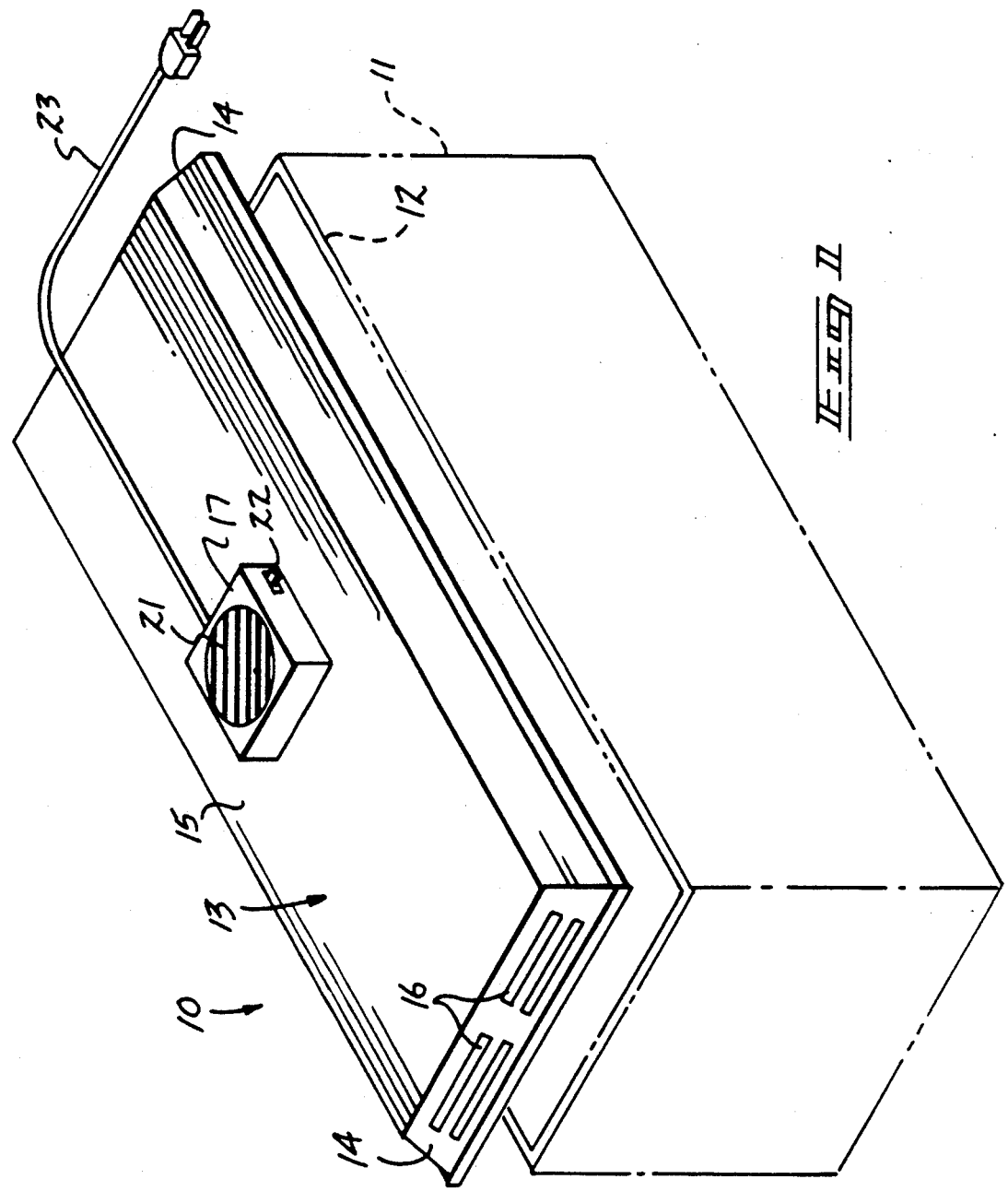
FIG. 1 is an isometric illustration of the instant invention.

With reference now to the drawings, and in particular to FIGS. 1 to 8 thereof, a new and improved fish tank ventilation apparatus embodying the principles and concepts of the present invention and generally designated by the reference numeral 10 will be described.

More specifically, the fish tank ventilation apparatus 10 of the instant invention essentially comprises a fish tank 11 having an upper perimeter edge 12 mounting a cover hood 13 thereon. The cover hood 13 is formed with end walls 14 and a top wall 15. The end walls 14 include a plurality of end wall exhaust slots 16 directed therethrough to exhaust pressurized air directed into the hood through a fan housing 17 mounted to the cover housing top wall. The fan housing 17 is formed with a fan motor 18 having a plurality of impeller blades 19 mounted to the fan motor to receive air from exteriorly of the fish tank cover hood 13 into the inner face between the fish tank cover hood 13 and the underlying fish tank 11. In this manner, crystallized salts and the like and their buildup is prevented from within the underside surface of the cover hood structure. The fan housing includes a fan housing entrance 20 received to direct air therethrough with a top wall of the fan housing, with a grid 21 to prevent objects of a greater size and spacing of adjacent grid slats. An on/off switch 22 is provided operative through an electrical power supply 23 (or alternatively a battery power supply) to effect selective actuation of the fan motor 18.

As air is directed into the fan housing 17, it is exhausted through the end wall exhaust slots 16 to maintain an air barrier within the cover hood 13.

The FIGS. 4–8 illustrate the use of a manifold housing 24 integrally mounting the fan housing of a modified housing 17a therewithin, with the fan housing 17a positioned medially to an underside surface of the cover hood top wall 15 and the associated fan housing entrance 20 aligned medially and directed through the top wall 15, such as illustrated in FIG. 2. A manifold housing 24 extends longitudinally of the cover hood 13 orthogonally oriented and intersecting the end walls 14 between end wall exhaust slots 16. The manifold housing has spaced longitudinal side walls 25 (see FIG. 5 for example) each including spaced exhaust ports 26 directed therethrough in pneumatic communication with the fan housing 17a. As the fan motor and impeller blades 18 and 19 respectively direct air into the fan housing 17a and through the pneumatic chambers 29 of the manifold housing 24, the pressurized air is directed in a spaced relationship below the cover hood 13 through the exhaust ports 26.

A plurality of fan housing cavities 28 are directed into the fan housing 17a through a bottom wall thereof to each accommodate and stabilize an illumination bulb "B" (see FIG. 4) that are orthogonally directed between the end plates 27 on opposed sides of the manifold housing 24 to receive illumination bulbs therewithin. Each bulb is mounted to a pair of ball sockets that are in turn mounted to the plates 27. Such bulbs are provided electrical energy for illumination in a conventional manner through the electrical supply 23 or an independent such power supply (not shown) known to one of ordinary skill in the art.

Further, with reference to the FIGS. 6–8, a plurality of feed cylinders 31 are directed into the manifold housing 24 on opposed sides of the fan housing 17a and the feed cylinders received through a manifold housing lower floor 34. Each feed cylinder has a feed cylinder lid 32 mounted to a cylinder flange 33 fixedly secured to an upper distal end of a feed cylinder side wall 37. The feed cylinder includes a floor plate 35 normally biased in a closed orientation by a spring hinge 38, with a floor plate lever 36 fixedly secured to the floor plate directed through a side wall 37, with the lever 36 positioned above the floor plate 35 through the side wall, whereupon downward projection of the lid 32 into the manifold 24 effects displacement of the floor plate 35 by rotation of the floor plate about the spring hinge 38. In this manner, fish food or the like may be stored within the cylinders for directing food through the manifold into an underlying body of water. The feed cylinder bores 39 directed through the manifold 24 receive the feed cylinders therethrough, in a manner as illustrated in FIG. 7 for example. It should be noted that the manifold's top wall receiving the feed cylinders therethrough is coplanar with the cover hood's top wall 15, in a manner as illustrated in the FIG. 5, to provide for the feed cylinder's ease of positioning relative to the organization and for its use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish tank ventilation apparatus, comprising,
   a fish tank having an upper perimeter edge, and
   a cover hood mounted removably relative to the upper perimeter edge, with the cover hood having spaced cover hood end walls and a top wall extending coextensively between the end walls, and
   each end wall of said end walls includes end wall slots directed therethrough, and
   a fan housing mounted within the cover hood, the fan housing having a fan motor, the fan motor having impeller blades mounted to the fan motor for directing air into the cover hood for directing such air through the end wall exhaust slots.

2. An apparatus as set forth in claim 1 wherein the fan housing is mounted within a manifold housing, the manifold housing is mounted to an interior surface of the cover hood, and the fan housing includes a fan housing entrance directed through the cover hood top wall, with a grid mounted within the entrance.

3. An apparatus as set forth in claim 2 wherein the manifold housing includes manifold housing side walls extending coextensively between the cover hood end walls, and the side walls include exhaust ports directed therethrough, the side walls of the manifold housing define a pneumatic chamber, with the pneumatic chamber in pneumatic communication exteriorly of the manifold housing through the exhaust ports.

4. An apparatus as set forth in claim 3 wherein the fan housing includes a fan housing bottom wall, and the fan housing bottom wall includes spaced elongate housing cavities directed through the bottom wall, and each of the end plates includes bulb sockets, and the bulb sockets receive illumination bulbs, wherein the illumination bulbs are oriented parallel relative to the manifold housing, and an illumination bulb of said illumination bulbs is directed through each housing cavity of said housing cavities.

5. An apparatus as set forth in claim 4 wherein the manifold housing includes a manifold housing top wall coplanar with the cover housing top wall, and a plurality of feed cylinders directed through the manifold housing top wall through the manifold housing, and each feed cylinder includes a feed cylinder lid removably mounted relative to each feed cylinder, with each feed cylinder including a flange receiving a lid thereon, and the flange is biased above the manifold housing top wall in a first position, and each feed cylinder includes a feed cylinder side wall, each feed cylinder side wall mounts a spring hinge therethrough, and the spring hinge includes a floor plate positioned below a respective feed cylinder lid of each feed cylinder, and a floor plate lever is mounted to each floor plate, with each floor plate lever directed through a respective side wall of each feed cylinder, with the floor plate lever spaced above the floor plate in the first position, and the floor plate lever pivoted about the spring hinge in a second position to displace the floor plate relative to a lower distal end of a respective feed cylinder.

* * * * *